Patented Aug. 15, 1950

2,519,317

UNITED STATES PATENT OFFICE 2,519,317

CHLOROFLUORONITRO AROMATIC COMPOUNDS

Alfred J. Kolka, Birmingham, and Waldo B. Ligett, Berkley, Mich., assignors to Ethyl Corporation, New York, N. Y., a corporation of Delaware No Drawing. Application November 24, 1948, Serial No. 61,898

8 Claims. (Cl. 260—646)

This invention relates to a class of chlorofluoronitro aromatic compounds as new compositions of matter. It also relates to a process for protecting organic materials against fungus attack by employing said new compositions.

The new compounds of our invention are chlorofluoronitro aromatic compounds containing four or more chloro, fluoro and nitro groups in the aromatic nucleus and not less than one each of said groups in the aromatic nucleus. The nucleus may also be substituted with other groups.

Examples of the aromatic compounds from which our compounds may be made are benzene, naphthalene, anthracene, phenanthrene and chrysene. A representative list of our compounds is as follows:

Dichlorofluoronitrobenzene
Chlorodifluoronitrobenzene
Chlorofluorodinitrobenzene
Chlorofluoronitrobromobenzene
Chlorodifluoronitroethylbenzene
Chlorodifluorodinitrobenzene
Dichlorofluorodinitrobenzene
Dichlorodifluoronitrobenzene
Chlorodifluorodinitrophenol
Trichlorofluoronitrobenzene
Dichlorofluorodinitrophenylmethyl sulfide
Tetrachlorofluoronitrobenzene
Trichlorodifluoronitrobenzene
Dichlorotrifluoronitrobenzene
Chlorotetrafluoronitrobenzene
Trichlorofluorodinitrobenzene
Dichlorodifluorodinitrobenzene
Monochlorotrifluorodinitrobenzene
Chlorodifluoronitronaphthalene
Chlorofluorodinitromethylnaphthalene
Trichlorofluoronitroanthracene
Dichlorodifluorodinitrochrysene
Bromodichlorofluoronitrophenanthrene Our compounds are prepared by appropriate combinations of reactions involving chlorination, nitration, and the introduction of fluorine into the aromatic nucleus via diazotization procedures. The order of carrying out these reactions is varied according to the product desired. The following procedure for synthesizing trichlorofluorodinitrobenzene is typical of the mode of preparation of our compounds:

Aniline was diazotized in fluoroboric acid solution with sodium nitrite to benzenediazonium fluoborate. Benzenediazonium fluoborate may also be prepared by adding sodium fluoborate to a solution of benzenediazonium chloride prepared by diazotizing aniline in hydrochloric acid. The precipitate of benzenediazonium fluoborate was separated, dried, and decomposed by heat to fluorobenzene. The fluorobenzene was chlorinated in the presence of ferric chloride to a mixture of mono-, di-, and trichlorofluorobenzenes. This mixture was rectified and the products obtained were subjected to nitration. Mixed acid (18% nitric acid, 80% sulfuric acid) was prepared from appropriate quantities of concentrated sulfuric acid, fuming sulfuric acid, and fuming nitric acid. To this nitrating mixture maintained at a temperature of 60–65° C., was added trichlorofluorobenzene, and the temperature then raised to 90° C. for two hours. Upon completion of the reaction, water was added slowly, with cooling and agitation, and the organic layer separated. The organic layer was washed with sodium bicarbonate solution, dried, and rectified. The product, trichlorofluoronitrobenzene, was distilled at a temperature of 123° C. under a pressure of 9 millimeters of mercury absolute. The resulting mononitro product was treated at a temperature of 90–95° C. with a nitrating acid containing approximately 10% nitric acid and 90% sulfuric acid. The product from such nitration was recovered as before, distilled at a temperature of 142–153° C. under a pressure of 7 millimeters of mercury absolute, and then recrystallized from methanol. Identity of the material as trichlorofluorodinitrobenzene was established by chemical analysis of the final product as well as of the various intermediates.

Fungus attack on organic material, such as textiles, leather, lumber, hair, feathers, seeds, plants, paints and varnishes, causes a tremendous amount of damage. Mildew of clothing and shoes, for example, in high humidity zones, is responsible for heavy losses of these items. The experience of the military in damage to tenting and other items in the tropics is well known, as is the domestic experience with staining of lumber, failure of seeds to germinate, and fungus growth on painted surfaces. Our compounds are especially effective in combating the losses due to fungus growth.

Among the theories of the action of various halogenated "pesticides" is the theory that toxicity is related to the ease of splitting out by hydrolysis or other chemical attack, of the hydrogen halide. On this basis it would be predicted that fluorine compounds, due to their greater stability as compared to other halogen compounds, would be less toxic to bacteria, insects, fungi, etcetera. Contrary to what might have been predicted, we find that fluorine is a particularly desirable constituent in fungitoxicants, provided it is in certain combinations with other elements as specified in our invention. The effect of fluorine as compared to other halogens as substituents for hydrogen in toxic agents is clearly shown in the following tabulation of results obtained in the standard soil-burial test for protection of textiles against mildew.

*Protection provided against mildew*

| | Compound Used | Weeks of Protection Obtained |
|---|---|---|
| 1 | Control strip | <1 |
| 2 | Trichlorodinitrobenzene | 4 |
| 3 | Tetrachlorodinitrobenzene | 1 |
| 4 | Bromotrichlorodinitrobenzene | <1 |
| 5 | Trichlorofluorodinitrobenzene | 28 |
| 6 | Dichlorofluorodinitrobenzene | 10 |
| 7 | Chlorodifluorodinitrobenzene | 9 |

With reference to the table it will be noted that, whereas the substitution of the hydrogen atom in trichlorodinitrobenzene with either chlorine or bromine results in a decrease in the fungitoxic effect, the substitution by fluorine results in an outstanding increase.

Further confirmation of the beneficial effect of fluorine was given by results of soil-burial tests comparing tetrachloronitrobenzene and trichlorofluoronitrobenzene; the former giving protection for only one half as long as the latter in which one of the chlorine atoms is replaced with a fluorine atom.

Although the beneficial effect of fluorine is thus clearly demonstrated, it can not be assumed that the mere introduction of fluorine to an aromatic nucleus will yield a compound which would function as a good insecticide. For example, trichloronitrobenzene gives protection against mildew for four weeks, whereas trifluoronitrobenzene gives protection for only one week. However when fluorine is introduced into a benzene nucleus containing chloro, and nitro groups as defined in our invention, outstanding fungicides are obtained.

We claim:

1. A composition of matter for use as a fungicide comprising a fluorochloronitroaromatic compound having an aromatic nucleus of 6 to 18 carbon atoms, having at least 4 fluoro, chloro and nitro groups attached to the said aromatic nucleus and not less than 1 each of said groups attached to said aromatic nucleus.

2. A composition of matter for use as a fungicide comprising a fluorochloronitroaromatic hydrocarbon of the benzene series having from 4 to 6 inclusive of chloro, fluoro and nitro groups attached to said benzene nucleus and not less than 1 each of said groups attached to said benzene nucleus.

3. A fungicide containing as an essential ingredient a fluorochloronitrobenzene having at least 4 chloro, fluoro, and nitro groups attached to the benzene nucleus and not less than 1 each of said groups attached to the benzene nucleus.

4. A fungicide containing as its essential active ingredient a fluorochloronitrobenzene having at least 5 chloro, fluoro, and nitro groups attached to the benzene nucleus and not less than 1 each of said groups attached to the benzene nucleus.

5. A fungicide containing as its essential active ingredient a fluorochloronitrobenzene having at least 6 chloro, fluoro, and nitro groups attached to the benzene nucleus and not less than 1 each of said groups attached to the benzene nucleus.

6. A fungicide containing at its essential active ingredient a trichlorofluorodinitrobenzene.

7. A fungicide containing as its essential active ingredient a dichlorofluorodinitrobenzene.

8. A fungicide containing as its essential active ingredient a chlorodifluorodinitrobenzene.

ALFRED J. KOLKA.
WALDO B. LIGETT.

REFERENCES CITED

The following references are of record in the file of this patent:

UNITED STATES PATENTS

| Number | Name | Date |
|---|---|---|
| 2,191,301 | Smith | Feb. 20, 1940 |

OTHER REFERENCES

Ingold et al., J. S. C. (London), pages 422, 2265 (1928).